G. H. CORLISS.
Pump-Valve.

No. 215,800. Patented May 27, 1879.

WITNESSES:
W. Colborne Brookes
Chas. L. Stetson

INVENTOR:
George H. Corliss
by his attorney
J. B. Stetson

G. H. CORLISS.
Pump-Valve.

No. 215,800. Patented May 27, 1879.

WITNESSES:
W. Colborne Brookes
Chas. C. Stetson

INVENTOR:
George H. Corliss
by his attorney
Thomas D. Stetson

UNITED STATES PATENT OFFICE.

GEORGE H. CORLISS, OF PROVIDENCE, RHODE ISLAND.

IMPROVEMENT IN PUMP-VALVES.

Specification forming part of Letters Patent No. 215,800, dated May 27, 1879; application filed January 10, 1879.

*To all whom it may concern:*

Be it known that I, GEORGE H. CORLISS, of Providence, in the State of Rhode Island, have invented certain new and useful Improvements relating to Pump-Valves; and I do hereby declare that the following is a full and exact description thereof.

The invention applies to that class of pump-valves which, instead of turning upon hinges, rise and fall bodily in opening and closing, and require some means of guiding them in these movements.

The present invention is intended as an improvement on the invention set forth in the patent to me May 8, 1877, No. 190,469. In this, as in that construction, the valve is annular, so that when it lifts, the water flows past it, not only on the outside, but also through the inside. In this, as in that, I employ a spiral spring, which lies between the movable valve and stationary abutting shoulders. In that construction the valve was formed with a flange at the inner edge, which was designed to slide against guides reaching up from the seat. My present invention avoids the employment of any provision against the wear of sliding surfaces, as the valves are controlled in their regular movements by a spring which serves the double purpose of a frictionless guide and that of imparting to the valve its closing movement.

My present spring, which is helical in form, has the elasticity of the original helical spring in the line of movement of the valve; but, whereas that was also flexible in transverse directions, this, on the contrary, presents transversely great rigidity, resulting from the peculiar form given to it for that purpose. As the lower portion of the spring rests with a broad and fair bearing upon the upper face of the valve, there is sufficient friction or traction between the surfaces to prevent their sliding upon each other. The valve works under the impact of the spring, the same, practically, as if it were working in rigid guides, while there is no friction to be overcome and no wear of material by the friction, as has heretofore existed between the valve and the interior guides.

The following is a description of what I consider the best means of carrying out the invention.

Figure 3:
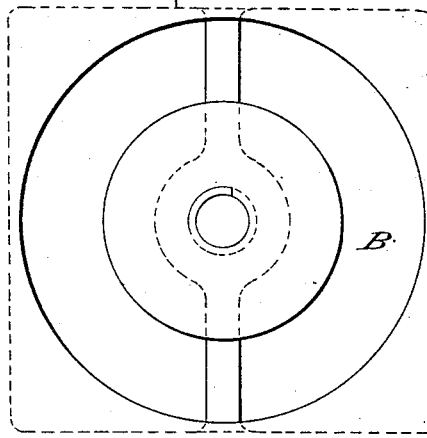
Figure 4:
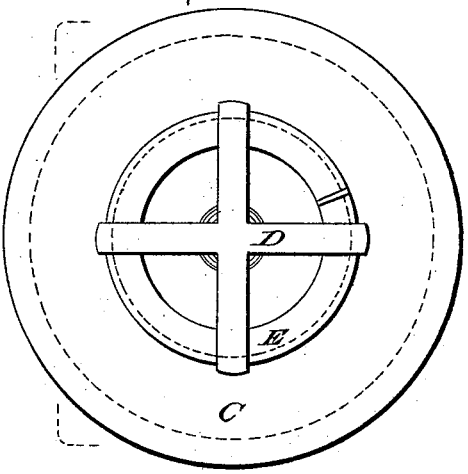
Figure 1:
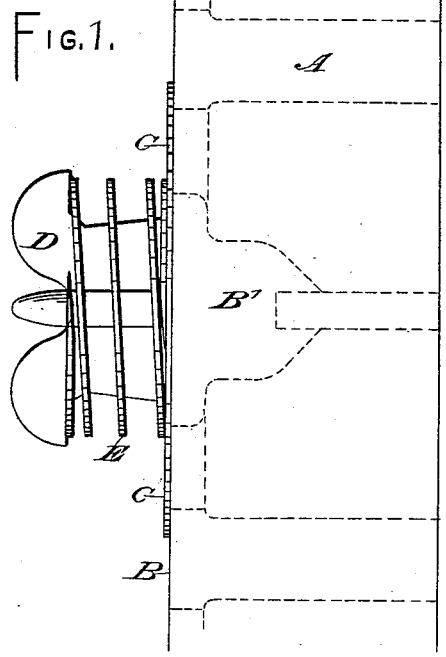
Figure 2:
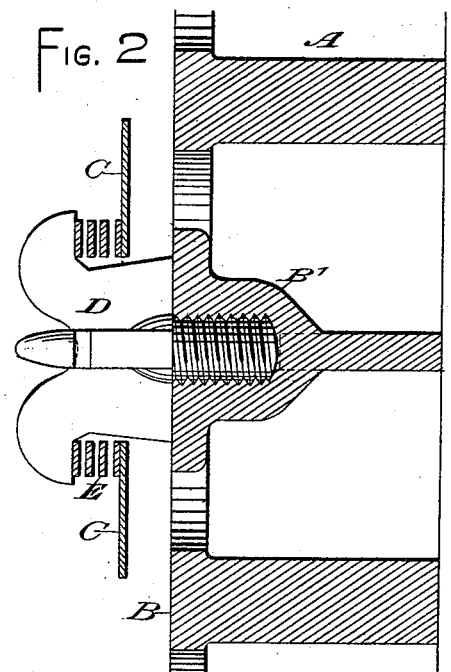
Figure 5:
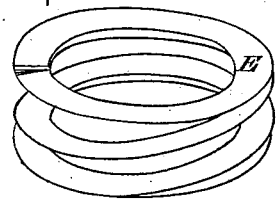

Figure 1 is a side elevation; Fig. 2, a central vertical section; Fig. 3, a plan view of the seat alone; Fig. 4, a plan view of the device complete; and Fig. 5 represents a perspective view of the valve-spring separately.

Similar letters of reference indicate like parts in all the figures.

A is a part of the solid casting which constitutes a portion of the pump-barrel, and in which the valve-seat B is formed. The seat is provided with a central boss, B', and with braces, as indicated, which support it.

D is a winged guard, screwed into the boss B'. Above the surface of the boss B' the wings of the guard D are slightly inclined inward as they rise from the valve-seat. These wings are of such diameter at their base that they nearly fill the opening in the annular valve C. The valve is preferably made of phosphor-bronze, to secure the utmost lightness consistent with the requisite strength.

E is a helical spring, which, in cross-section, as indicated, presents great breadth with comparatively little thickness. By this distribution of the metal I secure perfect elasticity for moving the valve, combined with a degree of transverse rigidity which constitutes it a secure guide for the same. The lower surface of the spring rests fairly on the upper face of the valve C, and its upper surface engages under projections formed on the guard D. The wings of the guard, as indicated, are at their bases carefully fitted to the circular opening in the valve, and are also fitted at their junction with the projection on the guard to the interior surfaces of the spring.

The form of the edges of the wings D allows the spring E to move without contact therewith under ordinary working conditions; but when, from any floating obstruction or other extraneous cause, a lateral force is impressed on the valve or spring sufficient to press the valve to one side despite the guiding force due to the form of the spring, the wings D arrest the lateral displacement, thus serving as a guard.

I esteem it important to incline the edges of the wings D, as shown, so that the valve may be allowed to tilt on its seat when one edge is held up by any accidental cause without binding upon the wings.

If it should be found in any kind of service that the friction alone is not sufficient to keep the valve C and the lower surface of the spring E in fixed positions relatively to each other, they may be riveted or otherwise fastened together to secure that end.

Various modifications may be made. I have shown a spring about ten times as wide as it is thick, and of a width but little more than one-third of the width of the annular valve; but these proportions may be varied without changing the peculiar action of the spring. The metal or other material of which the valve is made may also be changed; but I prefer the phosphor-bronze, as it does not corrode, and seems to combine the utmost lightness consistent with the required strength. Nor is it applicable exclusively to the pumping of water and other liquids, as air and other gases may be substituted for liquids in a pump embodying this invention. I have shown a flat valve in the form of a ring, which I prefer; but my invention is available for operating valves which are not of this form. Many forms of light lifting valves may be substituted for the valve shown.

Figure 6:
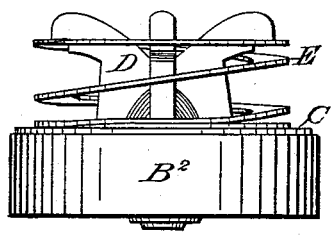
Figure 7:
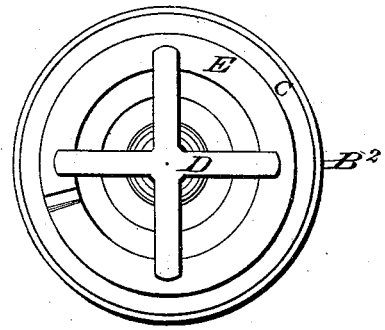

Fig. 6 represents a front view, and Fig. 7 a plan, of a modification of my invention.

In this case the valve-seat is formed in a separate piece or casting, $B^2$, adapted to be inserted into a suitable recess formed in the solid casting A. In other respects the construction is identical.

I claim as my improvement in pump-valve mechanism—

1. The helical spring E, of metal, formed as shown, so that the cross-section shall be wider in the direction of the diameter than its thickness, in combination with a valve, C, and adapted to perform the double functions of urging the valve to its seat and of guiding it without friction, as herein specified.

2. In combination with a valve, C, the spring E, serving both as a spring and a means of guiding, and the abutment-piece D, serving both as an abutment for the spring and a guard to prevent displacement of the valve, as herein specified.

In testimony whereof I have hereunto set my hand this 12th day of December, 1878, in the presence of two subscribing witnesses.

GEO. H. CORLISS.

Witnesses:
GEO. A. DODGE,
JESSE WALRATH.